United States Patent
Galizzi et al.

(10) Patent No.: US 10,793,131 B2
(45) Date of Patent: Oct. 6, 2020

(54) AUTOMATED CONTROLLED BRAKING SYSTEM FOR VEHICLES

(71) Applicant: FRENI BREMBO S.P.A., Curno, Bergamo (IT)

(72) Inventors: Valerio Galizzi, Curno (IT); Beniamin Szewczyk, Curno (IT); Massimo Di Stefano, Curno (IT); Luca D'Urso, Curno (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 46 days.

(21) Appl. No.: 16/094,046

(22) PCT Filed: Apr. 14, 2017

(86) PCT No.: PCT/IB2017/052164
§ 371 (c)(1),
(2) Date: Oct. 16, 2018

(87) PCT Pub. No.: WO2017/182925
PCT Pub. Date: Oct. 26, 2017

(65) Prior Publication Data
US 2019/0126900 A1    May 2, 2019

(30) Foreign Application Priority Data
Apr. 18, 2016  (IT) .................. 102016000039576

(51) Int. Cl.
*B60T 13/74* (2006.01)
*B60T 7/04* (2006.01)
*B60T 8/40* (2006.01)

(52) U.S. Cl.
CPC .......... *B60T 13/745* (2013.01); *B60T 7/042* (2013.01); *B60T 8/40* (2013.01); *B60T 8/4086* (2013.01); *B60T 2270/82* (2013.01)

(58) Field of Classification Search
CPC .......... B60T 7/042; B60T 7/12; B60T 13/745
(Continued)

(56) References Cited

U.S. PATENT DOCUMENTS 6,945,610 B1 * 9/2005 Mizutani ............... B60T 8/3275
303/11
9,248,816 B2    2/2016 Guo et al.
(Continued)

FOREIGN PATENT DOCUMENTS

DE    102004023007 A1    12/2005
FR    2855137 A1         11/2004

OTHER PUBLICATIONS

European Patent Office, International Search Report with Written Opinion, issued in PCT/IB2017/052164, dated Aug. 4, 2017, European Patent Office, Rijswijk, Netherlands.

*Primary Examiner* — Christopher P Schwartz
(74) *Attorney, Agent, or Firm* — Marshall & Melhorn, LLC

(57) ABSTRACT

A braking system for vehicles having at least one manual and/or automatic actuation device operatively connected to a processing and control unit to transmit thereto a request for a braking action by a user. The system may also have at least one first electro-hydraulic actuator device operatively connected to a first and second hydraulic supply circuit of a respective first and second braking device. The first electro-hydraulic actuator device may be actuated by the processing and control unit depending on the request for a braking action.

20 Claims, 13 Drawing Sheets

(58) Field of Classification Search
USPC .......... 303/114.1, 115.1–115.3, 116.1–116.4
See application file for complete search history.

(56) References Cited

U.S. PATENT DOCUMENTS

| | | | |
|---|---|---|---|
| 9,586,487 B2 | 3/2017 | Knechtges | |
| 2008/0284242 A1* | 11/2008 | Ganzel | ............... B60T 7/12 303/114.1 |
| 2009/0039702 A1* | 2/2009 | Nishino | ............. B60T 7/042 303/114.1 |

* cited by examiner

AUTOMATED CONTROLLED BRAKING SYSTEM FOR VEHICLES

SCOPE

The present invention relates to an automated controlled braking system for vehicles, meaning both motor vehicles and motorcycles with two or more wheels.

STATE OF THE ART

In particular, the use of braking systems with "Brake By Wire" actuators is becoming increasingly popular in the art: in other words, the user does not directly control the braking devices, whether disc brake calipers or drums, by directly actuating a lever or pedal that pressurizes the system fluidically connected to such braking devices; instead, the braking request by the user, exerted by the actuation of a lever or pedal, is read and converted into the corresponding actuation of the braking devices by the relative actuators. Such actuators are usually of an electro-mechanical or electro-hydraulic type and include, for example, an electric motor actuating operatively a kinematic mechanism to said braking devices. For example, the kinematic mechanism may include a hydraulic piston that generates the pressure required to actuate the braking device. It is also possible to make brake-by-wire-type actuation devices completely free of hydraulic circuits wherein the kinematic mechanism is directly connected, for example, to the pads or shoes of the braking device.

Always concerning safety issues, the BBW-type systems are particularly suitable to be integrated both with user-imposed braking force control devices acting on the relative manual controls such as levers and/or pedals, and with vehicle stability control systems that always act on the actuation of the braking devices.

With regard to braking force control devices known as ABS systems, they have, for example, the function of preventing the vehicle from possibly locking up one or more wheels due to an excessive braking action requested by the user, which would compromise the vehicle's stability and control.

Such situations are all the more dangerous when the vehicle is on low-adhesion surfaces, e.g. those that are slippery or wet. Moreover, such control devices are also used in the art for the dynamic stability control of the vehicle: it is in fact known that by applying a suitable braking force on the individual wheels, or, for example, by modifying the braking force distribution on the separate axles of the vehicle, it is possible to generate yaw moments that are able to correct the vehicle's trajectory, improving its dynamic control.

The solutions of the known art therefore typically provide for anti-lock systems, known as ABS systems, which act on hydraulic circuit braking systems substantially acting on the pressure of the hydraulic circuit of the braking system to modulate the hydraulic pressure and thus the braking force on the individual wheel subject to momentary locking.

Regarding the functions of vehicle stability control, also known as ESP, the object of these is to control the vehicle's stability by distributing the braking force in a variable manner between the different axles of the vehicle and between the wheels of the same axle of the vehicle.

It is also possible, as mentioned above, to impose a braking torque on the individual wheels of the vehicle in order to correct the trajectory and improve the vehicle's dynamic stability.

To sum up, BBW-type braking systems must be integrated with ABS-type braking control systems and with stability control devices.

All these devices provide for the possibility of acting by imposing or reducing the braking torque on the individual wheels of the vehicle simultaneously and independently of each other. Moreover, such devices may intervene as a result of the user actuating the braking system by correcting the user's same braking request or even by self-activating to control the vehicle's stability, for example when the trajectory set by the user is not consistent with the vehicle's actual one.

For example, in order to carry out all these actuations and adjustments, it is known in the art to equip the vehicle with a centralized pressure modulator having only one main pressure generator and the hydraulic management valves of the brakes' individual hydraulic lines, which is capable of carrying out the pressure control task also on the individual wheels. This solution is not without disadvantages. The modulator must be sized for the power required by the four wheels simultaneously, therefore bulk and weight problems are involved. In addition to design problems, control problems are also known linked to the fact that, with only one pressure generator and valve system, the independent pressure control performance between the axles of the vehicle and the individual wheels is limited.

Equipping each wheel of the vehicle with a specific actuator for its own braking device is also known.

In this way, each actuator of every single wheel may be actuated in a completely independent manner. This system architecture is not without disadvantages. In fact, the redundancy of actuator devices causes problems in the cost, weight and dimensions of the system. The various actuator devices must then be managed simultaneously by control units that must perform complex computing operations in a very short amount of time using data they receive from special sensors. Therefore, the costs of the control units for this type of operation also increase.

PRESENTATION OF THE INVENTION

Therefore, the need is felt for a solution to the disadvantages and limitations cited above with reference to the known art, i.e., the need to provide a braking system that ensures reliability, reduces actuation times and at the same time has components with a low mass and low cost.

This requirement is satisfied by a braking system for vehicles according to claim 1 and by a method of actuation and control of a vehicle braking system according to claim 25.

In particular, this requirement is satisfied by a braking system for vehicles (4) comprising at least one manual and/or automatic actuation device (8), operatively connected to a processing and control unit (12) to transmit thereto a request for a braking action, at least one first electro-hydraulic actuator device (16) operatively connected to a first and/or to a second hydraulic supply circuit (20,24) of a respective first and second braking device (28',28"), the first electro-hydraulic actuator device (16) being actuated by the processing and control unit (12) depending on the request for a braking action, wherein inside the first and second hydraulic supply circuits (20,24) a first and second device for regulating the pressure (48,52) are inserted, each interposed between the first electro-hydraulic actuator device (16) and the corresponding braking device (28', 28") so as to define an upstream branch (56), comprised between the first electro-hydraulic actuator device (16) and the relative pressure regulator device (48, 52), and a downstream branch (60), comprised between each pressure regulator device (48, 52) and the relative braking device (28',28"), each pressure regulator device (48,52) being operatively connected to the processing and control unit (12), wherein the processing and control unit (12) is programmed to be able to selectively and independently actuate the pressure regulator devices and the first electro-hydraulic actuator device (16), so as to set or vary the actuation pressures of the braking devices (28', 28") downstream of the regulator devices (48, 52), regardless of the delivery pressures of the first electro-hydraulic actuator device (36) upstream of the regulator devices (48, 52).

wherein the first and second hydraulic supply circuits (20,24) contain at least partially a volume of magneto-rheological or electro-rheological fluid (64), said volume of brake fluid (62) and said volume of magneto-rheological or electro-rheological fluid (64) being fluidically separate from each other, and wherein the regulator devices (48,52) comprise electric actuators suitable to generate a magnetic and/or electric field influencing said volume of magneto-rheological or electro-rheological fluid (64) and modify the rheological properties of the magneto-rheological or electro-rheological fluid to modulate the fluid connection between the first electro-hydraulic actuator device (16) and each corresponding braking device (28',28"), to selectively vary the delivery pressure in the downstream branches (60) of the respective braking devices (28',28").

According to one embodiment, the pressure regulator devices (48, 52) comprise secondary pumps suitable to modulate the fluid connection between the first electro-hydraulic actuator device (16) and each corresponding braking device (28',28"), said secondary pumps being fluidically connected via a respective upstream branch (56), with the first electro-hydraulic actuator device (16) and, via a respective downstream branch (60), with the corresponding braking device (28',28"), the upstream and downstream branches (56, 60) being crossed by brake fluid, the secondary pumps being crossed internally by said volume of magneto-rheological or electro-rheological fluid (64).

According to one embodiment, the pressure regulator devices (48,52) comprise secondary pumps suitable to modulate the fluid connection between the first electro-hydraulic actuator device (16) and each corresponding braking device (28',28"), said secondary pumps being fluidically connected via a respective upstream branch (56), with the first electro-hydraulic actuator device (16) and, via a respective downstream branch (60), with the corresponding braking device (28',28"), the upstream branches (56) being crossed by said volume of magneto-rheological or electro-rheological fluid (64), the downstream branches (56,60) being crossed by brake fluid.

According to one embodiment, the pressure regulator devices (48,52) comprise secondary pumps suitable to modulate the fluid connection between the first electro-hydraulic actuator device (16) and each corresponding braking device (28',28"), said secondary pumps being fluidically connected via a respective upstream branch (56), with the first electro-hydraulic actuator device (16) and, via a respective downstream branch (60), with the corresponding braking device (28',28"), the upstream branches (56) being crossed by brake fluid, the downstream branches (60) being crossed by said volume of magneto-rheological or electro-rheological fluid (64).

According to one embodiment, the pressure regulator devices (48,52) comprise secondary pumps suitable to modulate the fluid connection between the first electro-hydraulic actuator device (16) and each corresponding braking device (28',28"), said secondary pumps being fluidically connected, via a respective upstream branch (56), with the first electro-hydraulic actuator device (16) and, via a respective downstream branch (60), with the corresponding braking device (28',28"), the upstream and downstream branches (56,60) being crossed by said volume of magneto-rheological or electro-rheological fluid (64).

According to one embodiment, the first electro-hydraulic actuator device (16) comprises an electric motor (32) which actuates a pusher (36) acting on a pump (42) provided with two pistons (46,47) arranged in series, each piston (46,47) being fluidically connected with one of said first and second hydraulic supply circuits (20,24).

According to one embodiment, the first electro-hydraulic actuator device (16) comprises an electric motor (32) which actuates a pusher (36) acting on a pump (42) provided with two pistons (46,47) arranged in parallel, each piston (46,47) being fluidically connected with one of said first and second hydraulic supply circuits (20,24).

According to one embodiment, the processing and control unit (12) is programmed to actuate the first regulator device (48) to modulate the pressure between the upstream branch (56) and the downstream branch (60) of the first hydraulic supply circuit (20), in order to maintain a constant delivery pressure in said first braking device (28') in the downstream branch (60), while the first electro-mechanical actuator device (16) changes the delivery pressure to the second braking device (28").

According to one embodiment, the processing and control unit (12) is programmed to:

restore the delivery pressure of the first electro-hydraulic actuator device (16) so as to equal the value of the delivery pressure to the first braking device (28') in the downstream branch of the first regulator device (48), match the pressure of the downstream (60) and upstream branches (56) of the first hydraulic supply circuit (20), by actuating the first regulator device (48).

According to one embodiment, the processing and control unit (12) is programmed to:

not actuate the pressure regulator devices (48, 52), as long as the processing and control unit (12) validates the system operation (4), in case of correction of the braking being required, change the delivery pressure of the first electro-hydraulic actuator device (16), so as to maintain said actuation pressures of the braking devices (28', 28"), in case of changing the actuation pressure of only one of said braking devices (28") being required, activating the first electro-hydraulic actuator device (16) so as to provide the necessary actuation pressure to said braking device (28") and modulating the pressure of the delivery branch (60) of the other braking device (28'), by means of its regulator device (48), so as not to be affected by the change of pressure imposed by the first electro-hydraulic actuator device (16).

According to one embodiment, the processing and control unit (12) is programmed to actuate the first regulator device (48) to maintain a constant delivery pressure in the downstream branch (60) of the first braking device (28'), while the first electro-hydraulic actuator device (16) changes the delivery pressure to the second braking device (28").

According to one embodiment, the processing and control unit (12) is programmed to actuate the first regulator device (48) and the second pressure regulator device (52) at the same time, to modulate the delivery pressures in the respective downstream branches (60) of the first and second hydraulic supply circuits (20,24) with respect to the delivery pressure of the first electro-hydraulic actuator device (16).

According to one embodiment, the first electro-hydraulic actuator device (16) is operatively connected to the braking devices (28',28") associated with the wheels arranged on a first axle of an associable vehicle.

According to one embodiment, the processing and control unit (12) supervises the control of the dynamics, stability and braking of the vehicle and pilots at least one control unit for each electro-hydraulic actuator device (16,68).

According to one embodiment, the processing and control unit (12) is programmed to actuate the braking devices (28',28",80,82) by means of the respective first and second electro-hydraulic actuator devices (16,68) and the relative regulator devices (48,52,84,86), even when the manual actuation elements are not actuated by the user, so as to stabilize the dynamics of the associable vehicle according to the driving conditions.

According to one embodiment, the braking system (4) is provided with speed sensors applied on the wheels connected to the braking devices (28',28",80,82"), and the processing and control unit (12) is programmed to prevent the locking in rotation of the individual wheels, reducing the braking action on the wheel in the locking phase, by means of the relative electro-hydraulic actuator devices (16,68) and relative pressure regulator devices (48,52,84,86).

According to one embodiment, the braking system is provided with speed sensors applied on the wheels influenced by the braking devices (28',28",80,82), and the processing and control unit (12) is programmed to prevent the skidding in rotation of the individual wheels, applying a braking action on the wheel in the skidding phase, by means of the relative electro-hydraulic actuator devices (16,68) and relative pressure regulator devices (48,52,84,86).

According to one embodiment, the processing and control unit (12) is programmed to divide the braking action over the individual braking devices (28',28",80,82') so as to stabilize the trajectory of the vehicle, for an equal braking and deceleration action of the vehicle, appropriately actuating the relative electro-hydraulic actuator devices (16, 68) and the relative pressure regulator devices (48,52,84,86).

According to one embodiment, the brake fluid (62) and magneto-rheological or electro-rheological fluid volumes (64) are fluidically separate from each other, and are at least partially contained inside chambers (58) of the pressure regulator devices (48,52), said chamber (58) being demarcated, at least partly, by movable septums (59) which sealingly translate, maintaining the hydraulic separation between the brake fluid and magneto-rheological or electro-rheological fluid.

According to one embodiment, said movable septums (59) are subject to the action of elastic return means (61) calibrated to bring the septums (59) back to a position at rest, in a condition of disabling or non-use of the braking system.

DESCRIPTION OF THE FIGURES

Further features and advantages of the present invention will become more understandable from the following description of its preferred and non-limiting embodiments, wherein.

Figure 1:
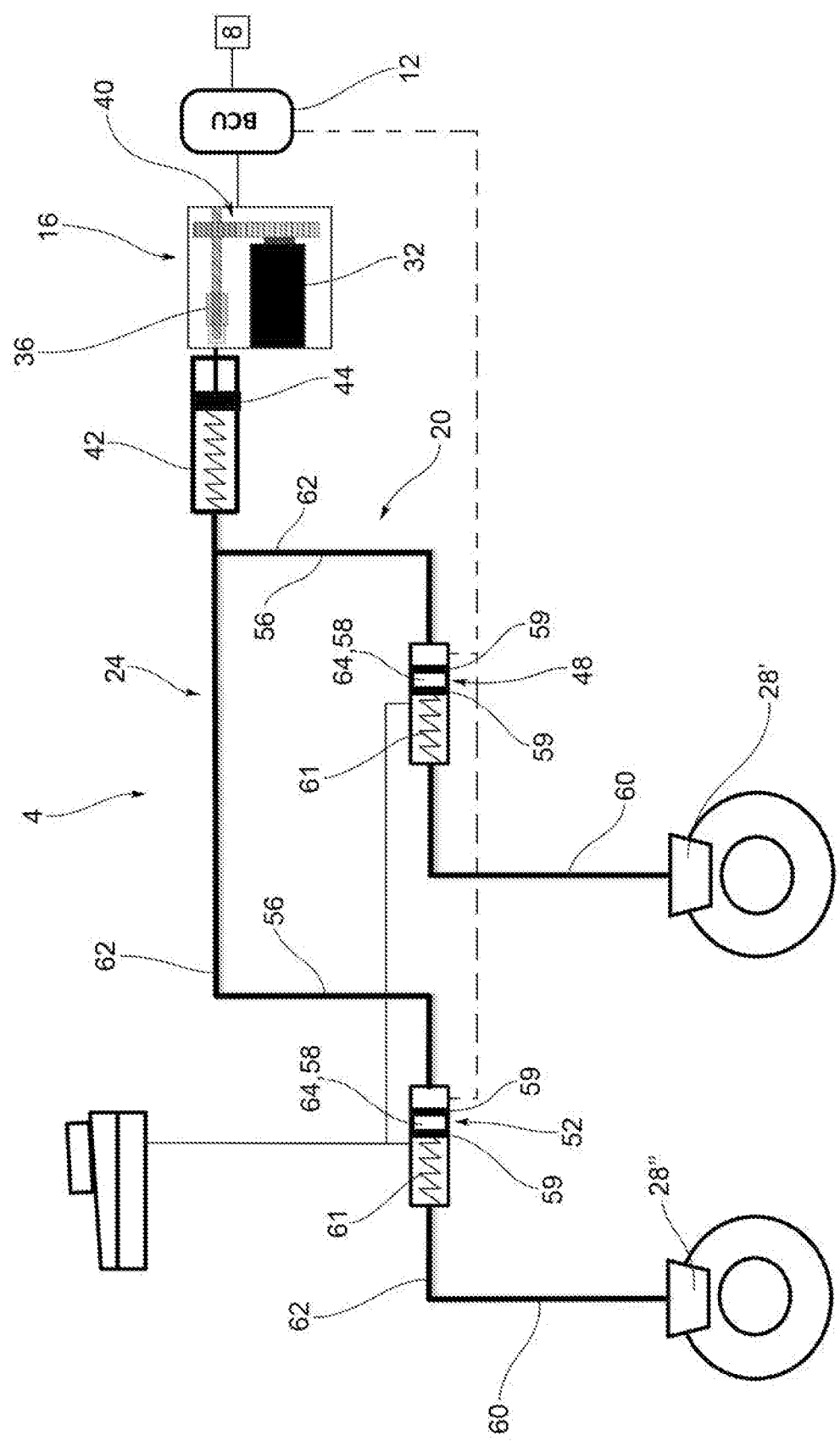
FIGS. 1-13 are schematic views of variants of embodiment of a braking system according to the present invention.

The elements or parts of elements in common between the embodiments described hereinafter will be indicated by the same numerical references.

DETAILED DESCRIPTION

With reference to the aforementioned figures, at least one portion of a vehicle braking system is generally indicated at 4.

First of all, for the purposes of the present invention, it is necessary to specify that 'vehicles' generally refers to motor vehicles, of any type, size and power, with at least two axles.

Moreover, for the purposes of the present invention, the type of braking devices employed downstream of the system on the wheels of the associable vehicle may be, preferably, but not exclusively, fixed or floating type disc brake calipers in a one-piece structure or two half-calipers bound together, but also drums, and so on.

The braking system 4 may comprise at least one manual and/or automatic actuation device 8.

A manual actuation device or manual actuator may comprise a lever, a pedal, or a button.

An automatic actuation device may comprise for example a sensor, a control unit or the like, suitable to generate a braking request to the vehicle both under normal driving conditions, e.g. in vehicles with automatic and/or remote control, also without a driver, and, e.g. in emergency braking conditions. For example, emergency braking may be activated automatically in the event of danger or imminent impact perceived by a sensor or control unit.

The manual actuator allows the user to provide a braking request to the braking system 4. Alternatively, as seen, this request may come from a processing and control unit.

The manual and/or automatic actuation device 8 may be connected to a braking simulator device (not shown) which provides feedback to the user, i.e., a resistance, depending on the force applied by the same. In other words, the braking simulator device simulates the resistance that a hydraulic pump would normally provide to the user.

It is possible, for example, to simulate a predefined, linear or non-linear actuation law that links the actuation force and/or stroke of the manual and/or automatic actuation device 8.

The connection between the manual actuator and the braking simulator device may be e.g. of the hydraulic type and may be regulated e.g. by means of suitable solenoid valves.

The manual actuator is operatively connected to a processing and control unit 12 to transmit thereto a request for a braking action by a user.

The system 4 comprises at least one first electro-hydraulic actuator device 16 operatively connected to a first and second hydraulic supply circuit 20,24 of a respective first and second braking device 28',28".

The first electro-hydraulic actuator device 16 is operatively connected and actuated by the processing and control unit 12 as a function of the braking action request.

The first electro-hydraulic actuator device 16 may be of various types.

According to one embodiment, the first electro-hydraulic actuator device 16 comprises an electric motor connected to a pusher 36 by means of a kinematic mechanism 40 which transforms the rotating motion of the electric motor 32 into the translational motion of the pusher 36.

The pusher 36 is fluidically connected to said first and second hydraulic supply circuits 20,24 so as to pressurize the hydraulic fluid contained in the same.

For example, the kinematic mechanism 40 comprises a pinion and a worm screw, coupled according to a reversible- or irreversible-type coupling. It is also possible to provide for the use of a recirculating ball screw.

According to one embodiment, the kinematic mechanism 40 connecting the electric motor 32 to the pusher 36 comprises rotation sensors of the electric motor 32 and displacement sensors of the pusher 36, so as to provide to the processing and control unit 12 data on the actual actuation of the first electro-hydraulic actuator device 16.

According to one embodiment, the first electro-hydraulic actuator device 16 comprises an electric motor which actuates the pusher 36 acting on a pump 42 provided with a piston 44 fluidically connected to said first and second hydraulic supply circuits 20,24 (FIG. 1-4).

According to a further embodiment (FIG. 5-8), the pump 42 comprises two pistons 46,47 arranged in series, each piston 46,48 being fluidically connected to one of said first and second hydraulic supply circuits 20,24.

The use of this type of so-called "tandem" pump guarantees the safety of the system in case of a malfunction of a branch, i.e. one of said hydraulic supply circuits 20,24 of the system 4.

According to a further embodiment (FIGS. 9-12), the first electro-hydraulic actuator device 16 comprises an electric motor 32 which actuates a pusher 36 acting on a pump 42 provided with two pistons 46,48 arranged in parallel, each piston 46,47 being fluidically connected with one of said first and second hydraulic supply circuits 20,24. Also in this case, the use of this type of parallel pump guarantees the safety of the system in case of a malfunction of a branch, i.e. one of said hydraulic supply circuits 20,24 of the system 4.

Advantageously, inside the first and the second hydraulic supply circuits 20,24 are inserted respectively first and second pressure regulator devices 48,52, each interposed between the first electro-hydraulic actuator device 16 and the corresponding braking device 28',28".

In this way, an upstream branch 56 is defined between the first electro-hydraulic actuator device 16 and the relative pressure regulator device 48,52, and a downstream branch 60 between each pressure regulator device 48,52 and the relative braking device 28',28".

Each pressure regulator device 48,52 is in turn operatively connected to said processing and control unit 12.

Advantageously, the processing and control unit 12 is programmed to be able to selectively and independently actuate the pressure regulator devices 48,52 and the first electro-hydraulic actuator device 16, so as to set or vary the actuation pressures of the braking devices 28',28" downstream of the pressure regulator devices 48,52, regardless of the delivery pressures of the first electro-hydraulic actuator device 16 upstream of the pressure regulator devices 48,52.

Advantageously, the first and second hydraulic supply circuits 20, 24 contain at least partially a volume of magneto-rheological or electro-rheological fluid 64, said volume of brake fluid 62 and said volume of magneto-rheological or electro-rheological fluid 64 being fluidically separate from each other.

'Brake fluid' refers to the normal fluid used in vehicle braking systems, for example, identified by its chemical/physical properties, by the terms DOT3, DOT4, etc. 'Magneto-rheological' or 'electro-rheological fluid' refers to a fluid whose rheological characteristics (typically its viscosity) are noticeably variable as a function of the magnetic or electric fields that influence it, i.e. pass through it.

The pressure control devices 48,52 comprise electric actuators (not shown) suitable to generate a magnetic and/or electric field.

Said magnetic and/or electric field is capable of influencing the characteristics of the magneto-rheological or electro-rheological fluid 64 to modulate the fluid connection between the first electro-hydraulic actuator device 16 and each corresponding braking device 28',28", so as to vary selectively the delivery pressure in the downstream branches 60 of the respective braking devices 28',28".

It should be noted that the term 'modulate' means the possibility of modifying the delivery pressure in the downstream branches 60 of the respective braking devices 28',28" regardless of the pressure in the upstream branches 56.

For example, by modifying the properties of the magneto-rheological or electro-rheological fluid, the downstream branch 60 may be isolated from the upstream branch 56: the fluid modifies its characteristics by simulating, in effect, the closing of a valve, so as to exclude the downstream branch 60, and thus the relative braking device 28',28" from the pressure variations that may occur in the upstream branch 56, as further described hereinafter. It is also possible to perform a modulation of the pressure regulator device 48,52, i.e. passing through intermediate operating conditions wherein the pressure variation in the upstream branch 56 is at least partially filtered, i.e. not transmitted, in the downstream branch 60. In other words, it is possible to modulate the operation of the pressure regulator devices 48,52 either by simulating an equivalent closure of a valve or by simulating a form of modulation.

It is clear however that in the condition of non-actuation of the pressure regulator device 48,52 the magneto-rheological or electro-rheological fluid behaves like any hydraulic fluid which transmits the pressure it receives; therefore, the pressure regulator device 48,52, in deactivation condition, functions as a very normal fluid of a braking circuit and performs a slight (however negligible) variation between the pressure in the upstream branch 56 and the pressure in the downstream branch 60.

As seen, the volume of brake fluid 62 and magneto-rheological or electro-rheological fluid 64 are fluidically separated from each other. Said volumes 62,64 may, for example, be delimited by the same upstream and/or downstream branches 56,60 of the hydraulic supply circuits 20,24, but may also be contained within the chambers 58 of the pressure regulator device 48,52. The chambers 58 may be isolated from the rest of the hydraulic supply circuits (such as in FIGS. 1,5,9,13) but may also be fluidically connected to the related portions of said hydraulic supply circuits, i.e. they may be fluidically connected to said upstream branches 56 and/or downstream branches 60.

The chambers 58 may be delimited, at least partly, by movable septums 59 which sealingly translate, maintaining the hydraulic separation between the brake fluid and the magneto-rheological or electro-rheological fluid.

Said movable septums (59) are subject to the action of elastic return means (61) calibrated to bring the septums (59) back to a position at rest, in a condition of deactivation or non-use of the braking system.

In particular, according to one embodiment, the pressure regulator devices 48,52 comprise secondary pumps suitable to modulate the fluid connection between the first electro-hydraulic actuator device 16 and each corresponding braking device 28',28", wherein said secondary pumps are fluidically connected via a respective upstream branch 56, with the first electro-hydraulic actuator device 16 and, via a respective downstream branch 60, with the corresponding braking device 28',28".

Figure 5:
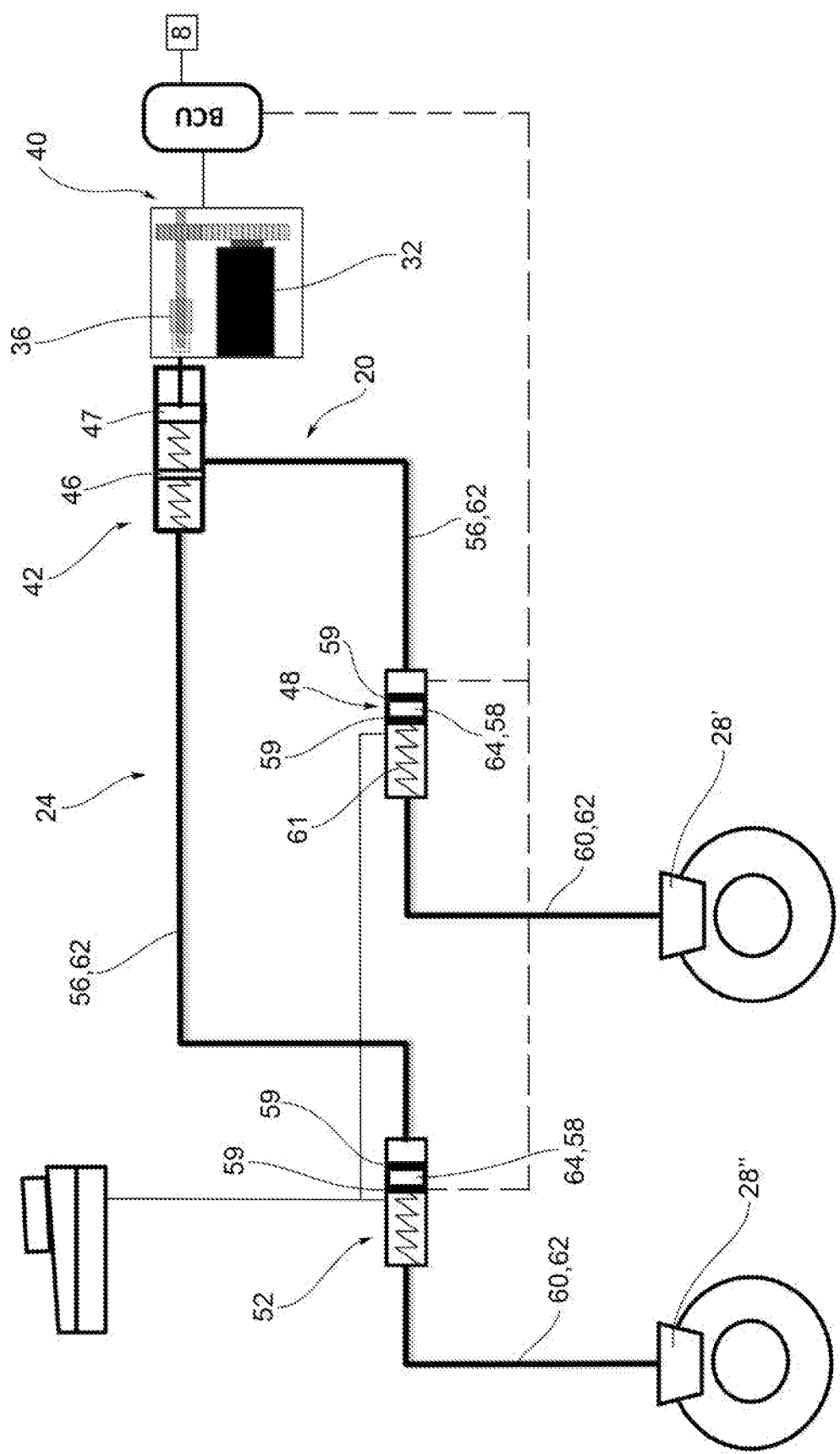
Figure 9:
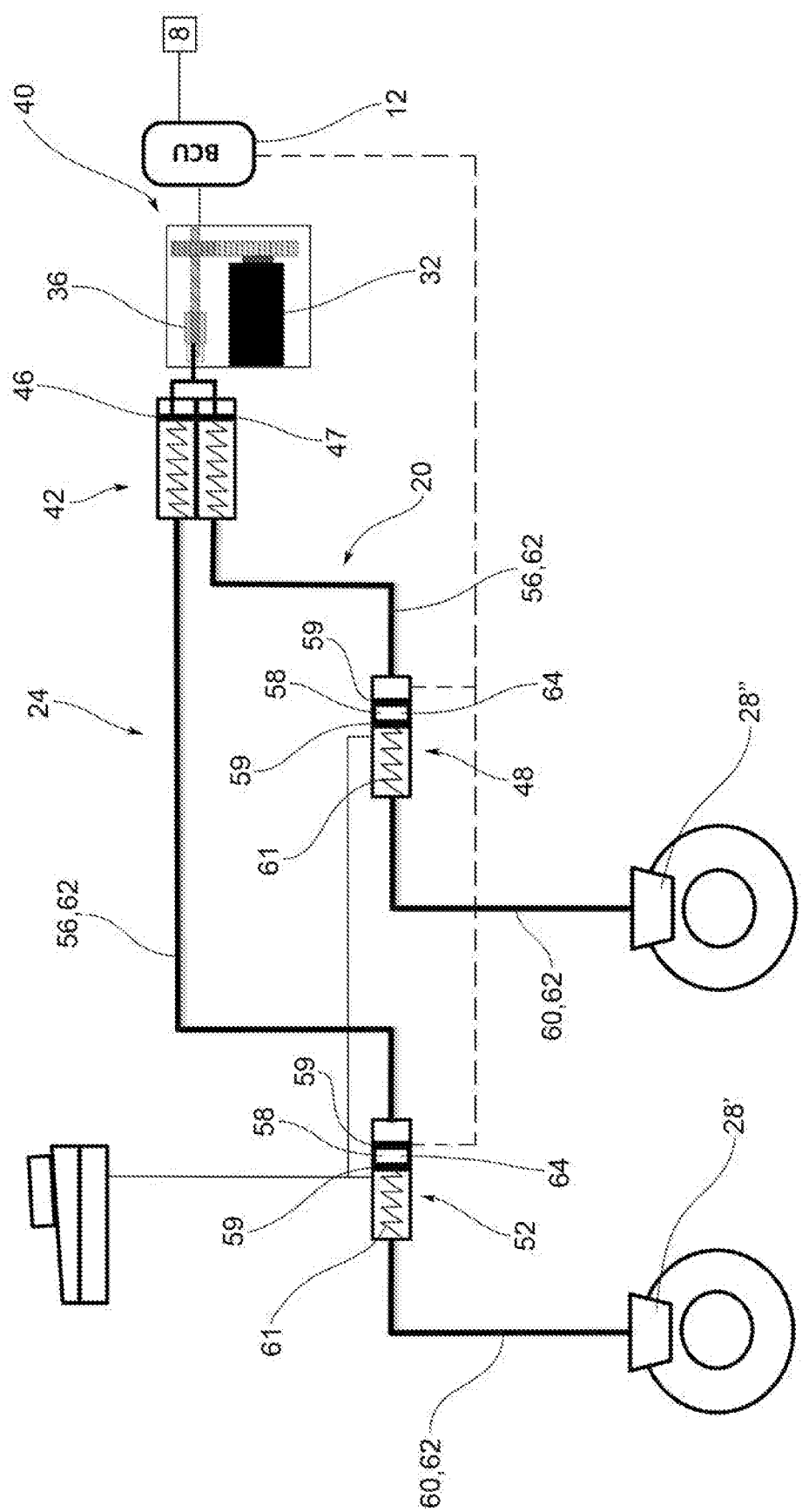

The upstream and downstream branches 56,60 are crossed by brake fluid (in a conventional manner), whereas the secondary pumps are crossed internally by said volume of magneto-rheological or electro-rheological fluid 64 (FIGS. 1,5,9).

Figure 2:
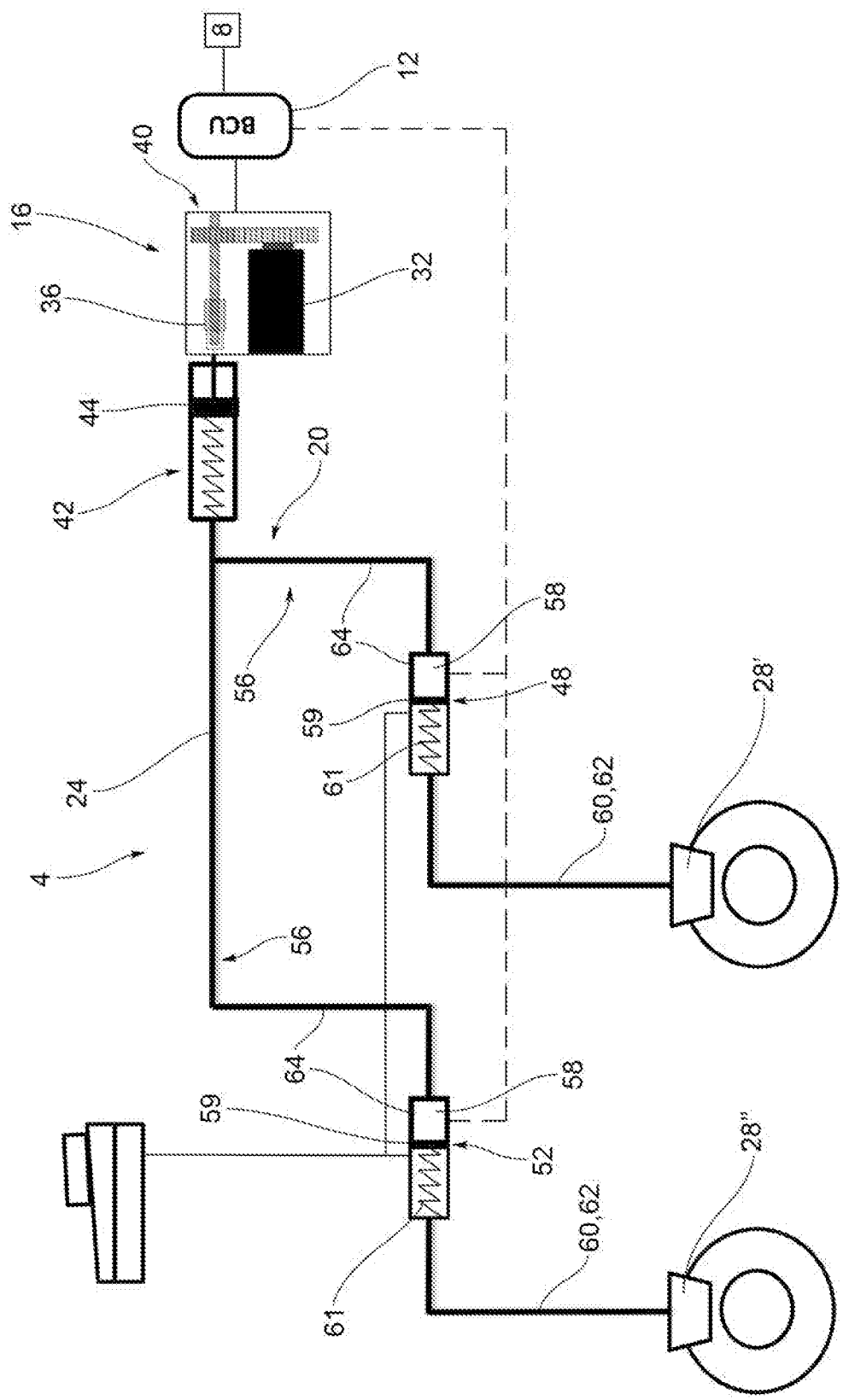
Figure 6:
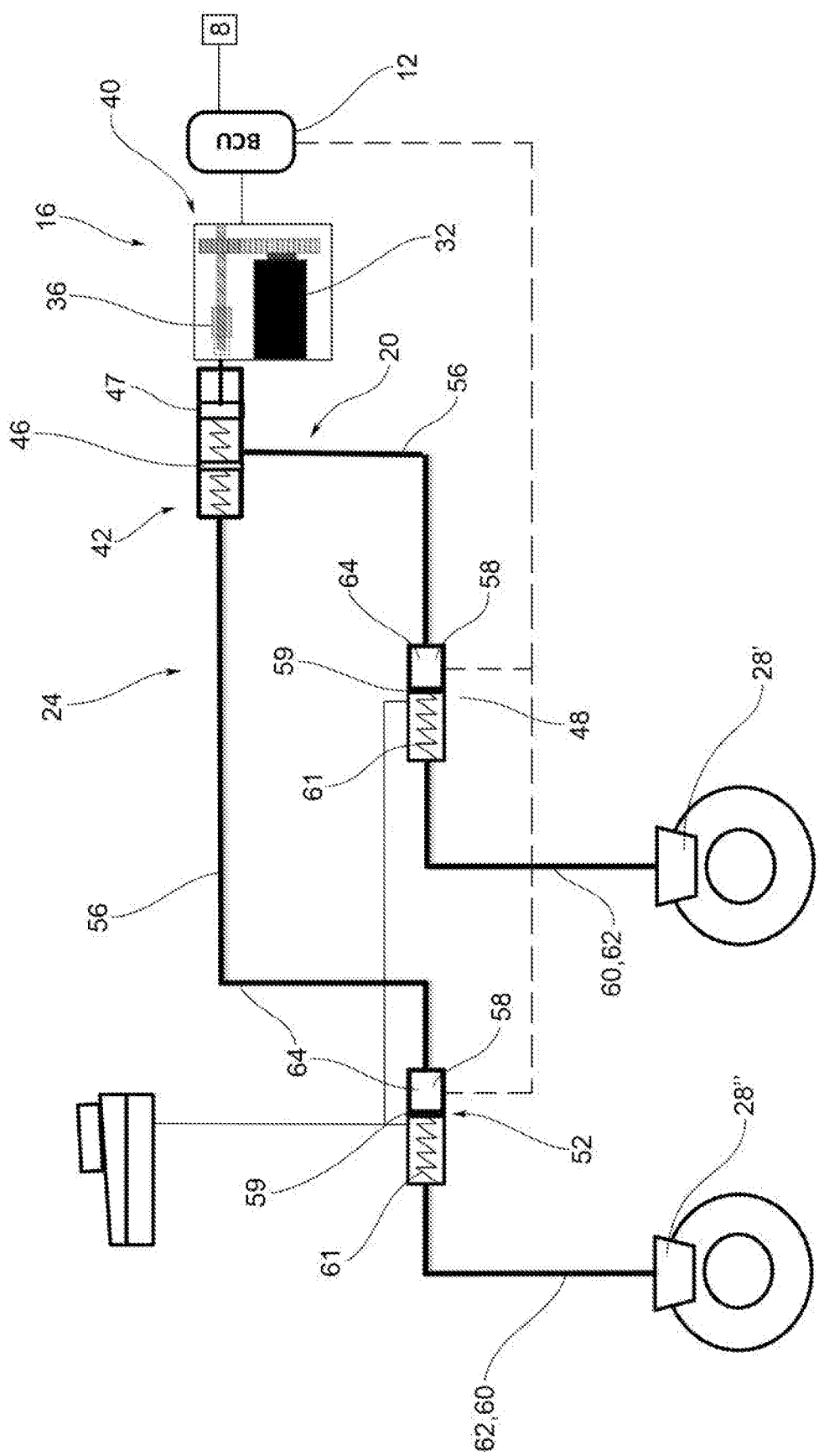
Figure 10:
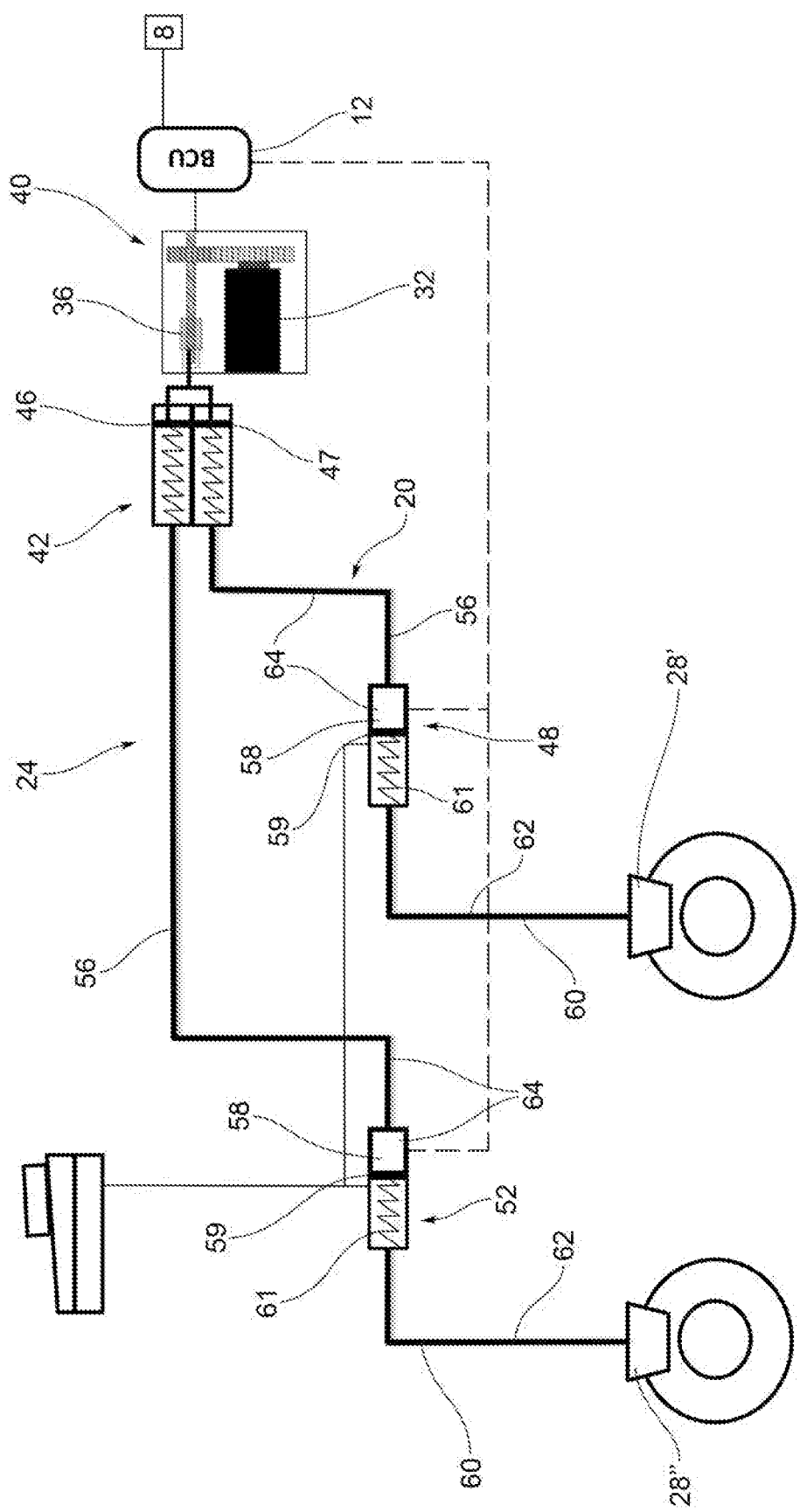

According to a further embodiment, the pressure regulator devices 48,52 comprise secondary pumps suitable to modulate the fluid connection between the first electro-hydraulic actuator device 16 and each corresponding braking device 28',28", said secondary pumps being fluidically connected, via a respective upstream branch 56, with the first electro-hydraulic actuator device 16 and, via a respective downstream branch 60, with the corresponding braking device 28',28", wherein the upstream branches 56 are crossed by said volume of magneto-rheological or electro-rheological fluid 64, and the downstream branches 60 are crossed by brake fluid (FIGS. 2,6,10).

Figure 3:
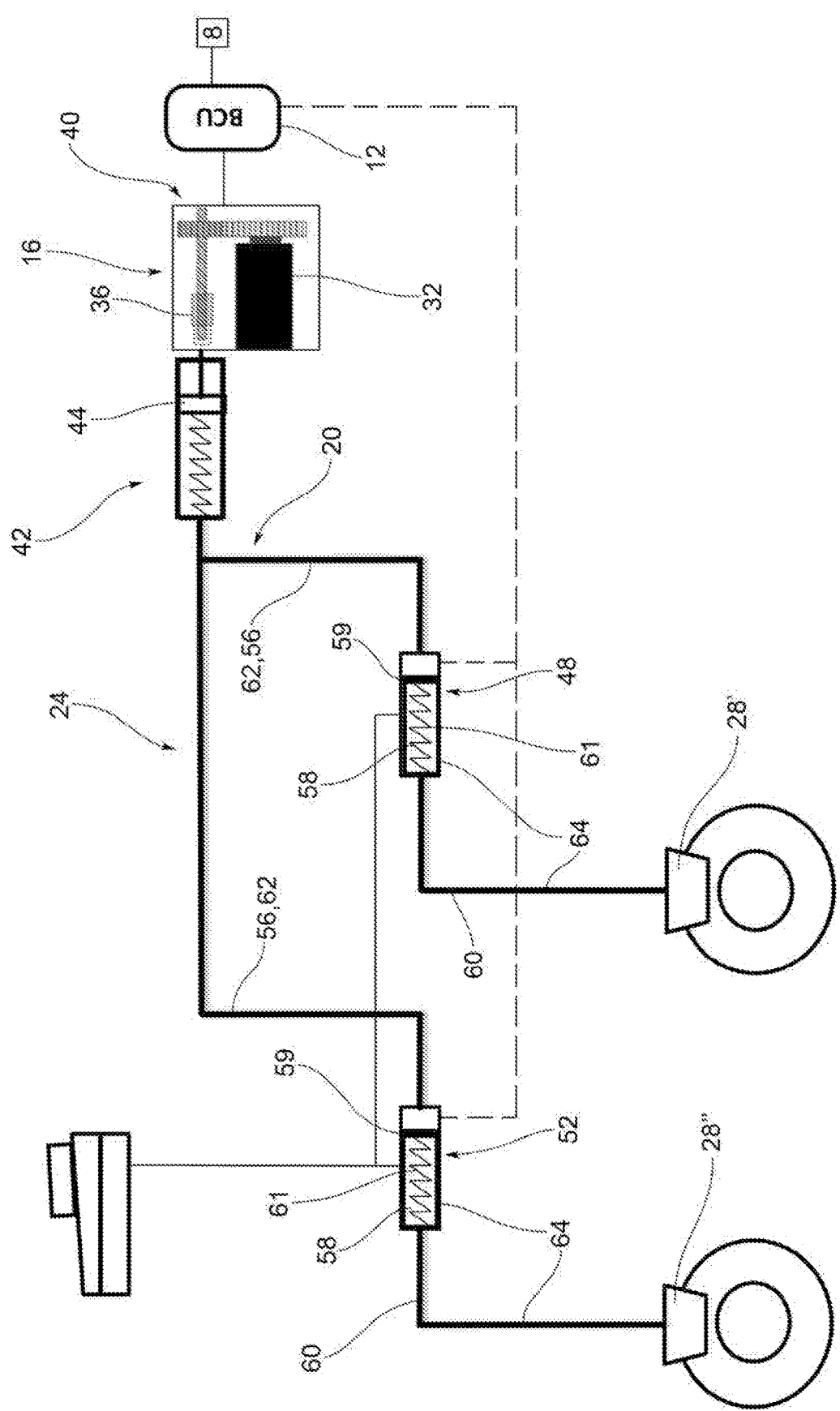
Figure 7:
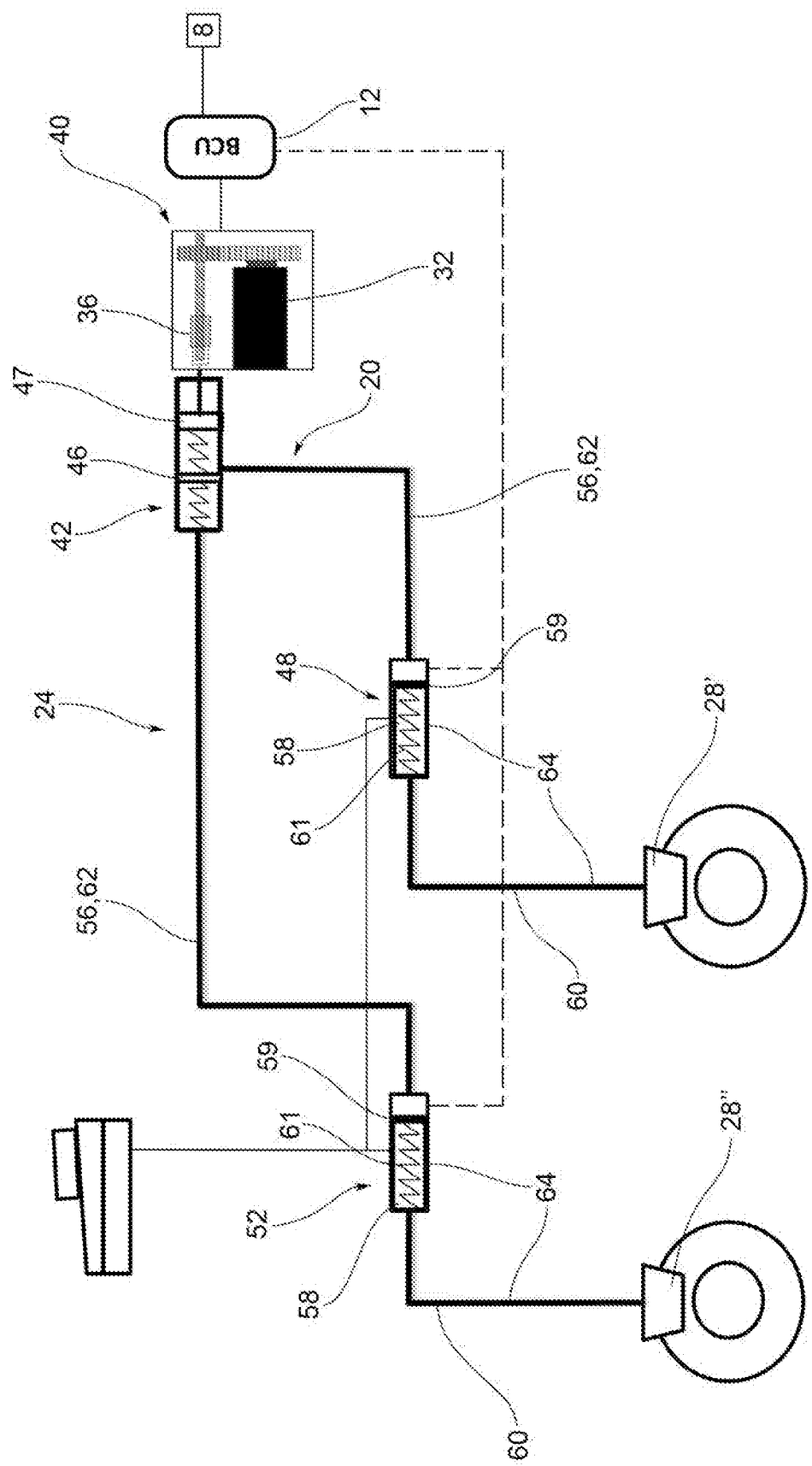
Figure 11:
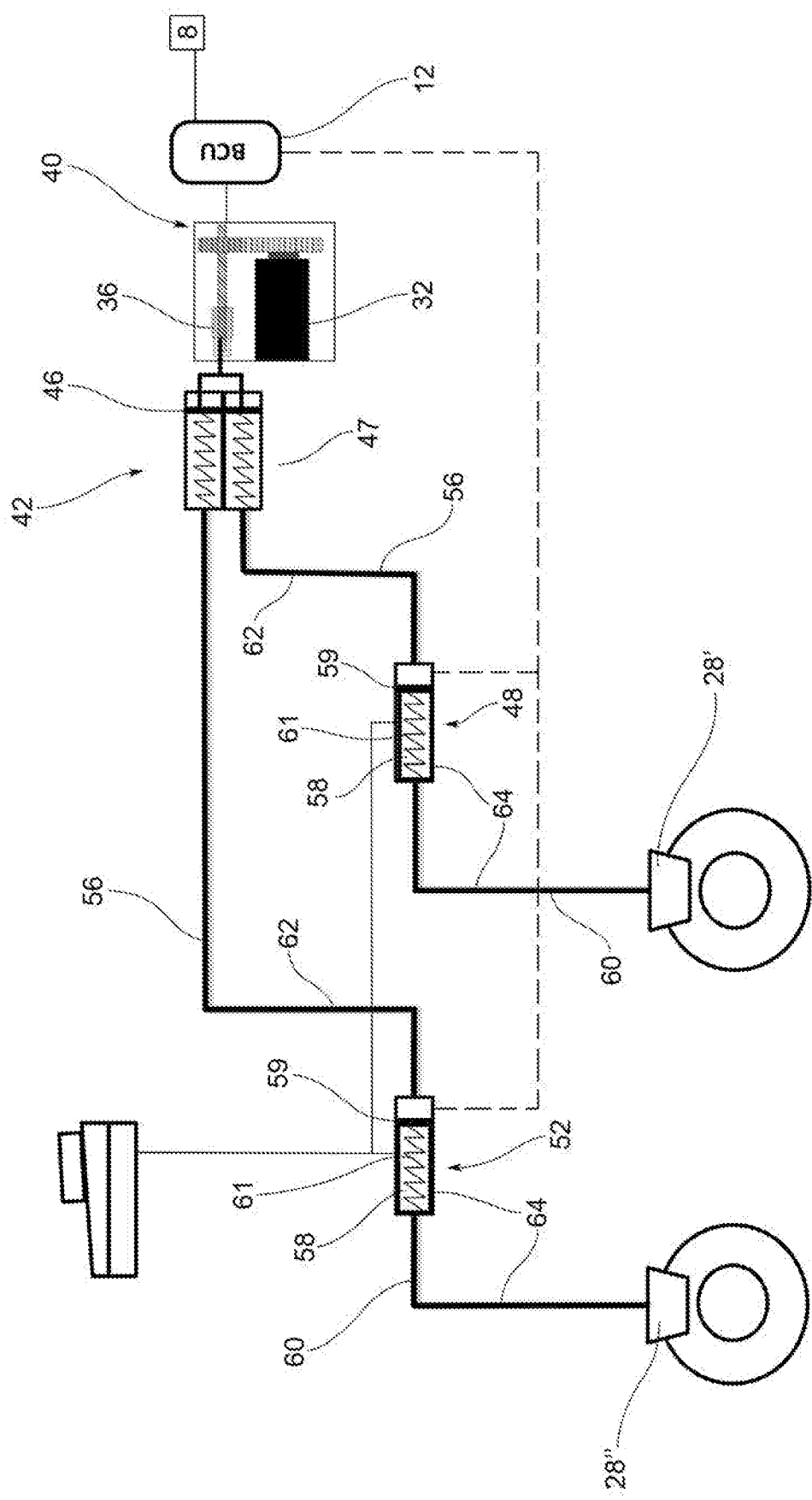

According to a further embodiment, the pressure regulator devices 48,52 comprise secondary pumps suitable to modulate the fluid connection between the first electro-hydraulic actuator device 16 and each corresponding braking device 28',28", said secondary pumps being fluidically connected, via a respective upstream branch 56, with the first electro-hydraulic actuator device 16 and, via a respective downstream branch 60, with the corresponding braking device 28',28", the upstream branches 56 being crossed by brake fluid, and the downstream branch 60 being crossed by said volume of magneto-rheological or electro-rheological fluid 64 (FIGS. 3,7,11).

Figure 4:
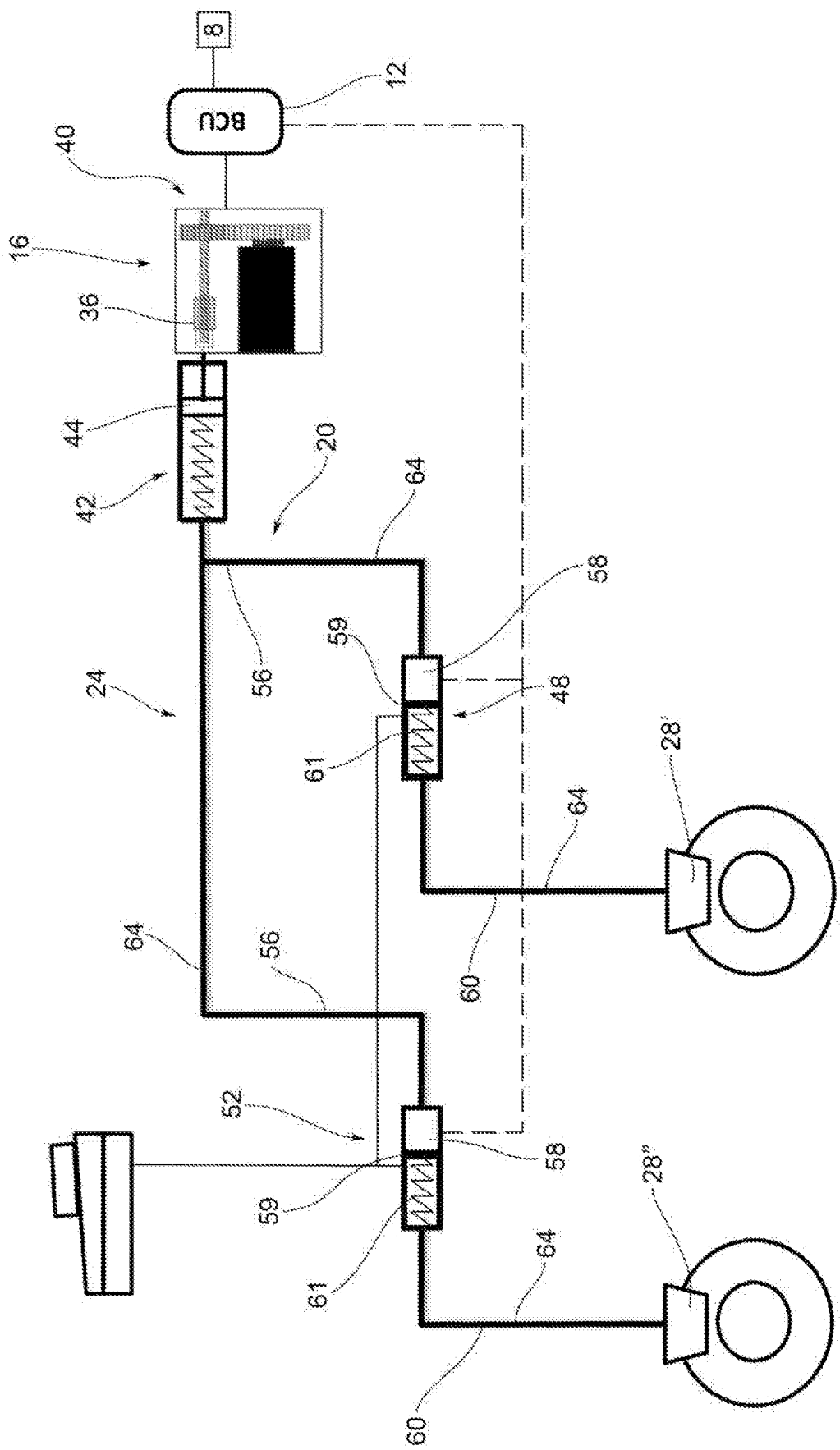
Figure 8:
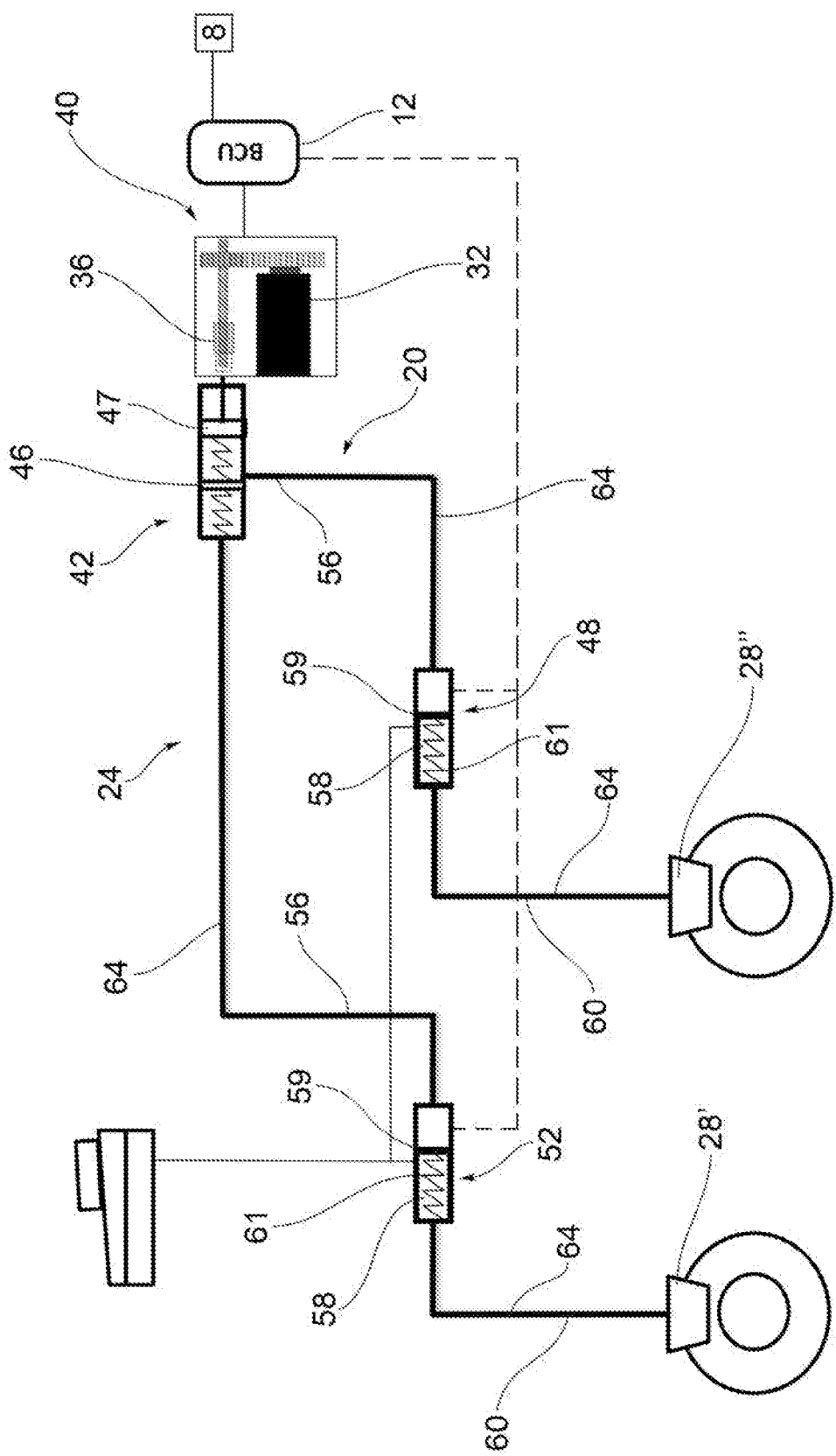
Figure 12:
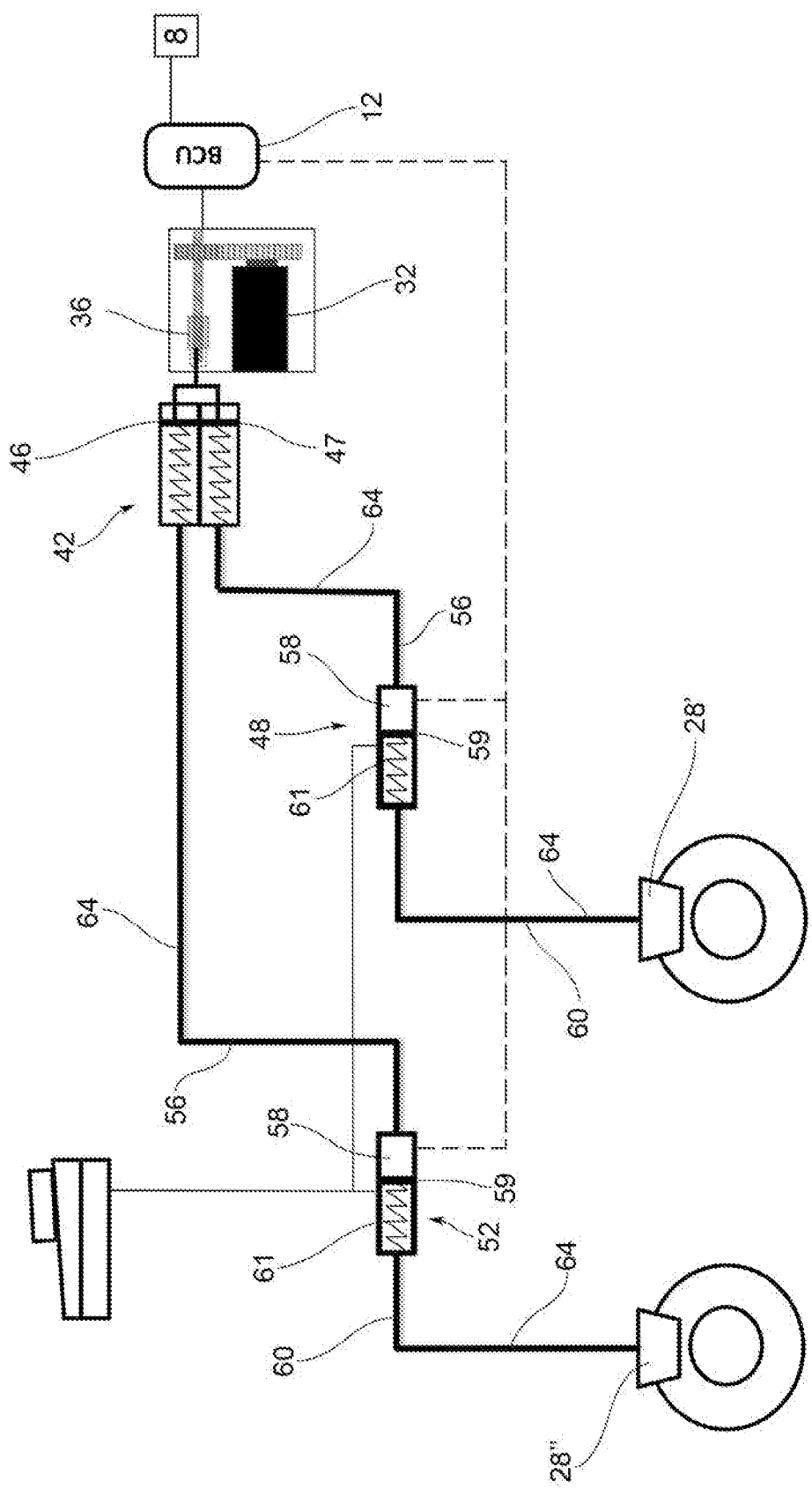
Figure 13:
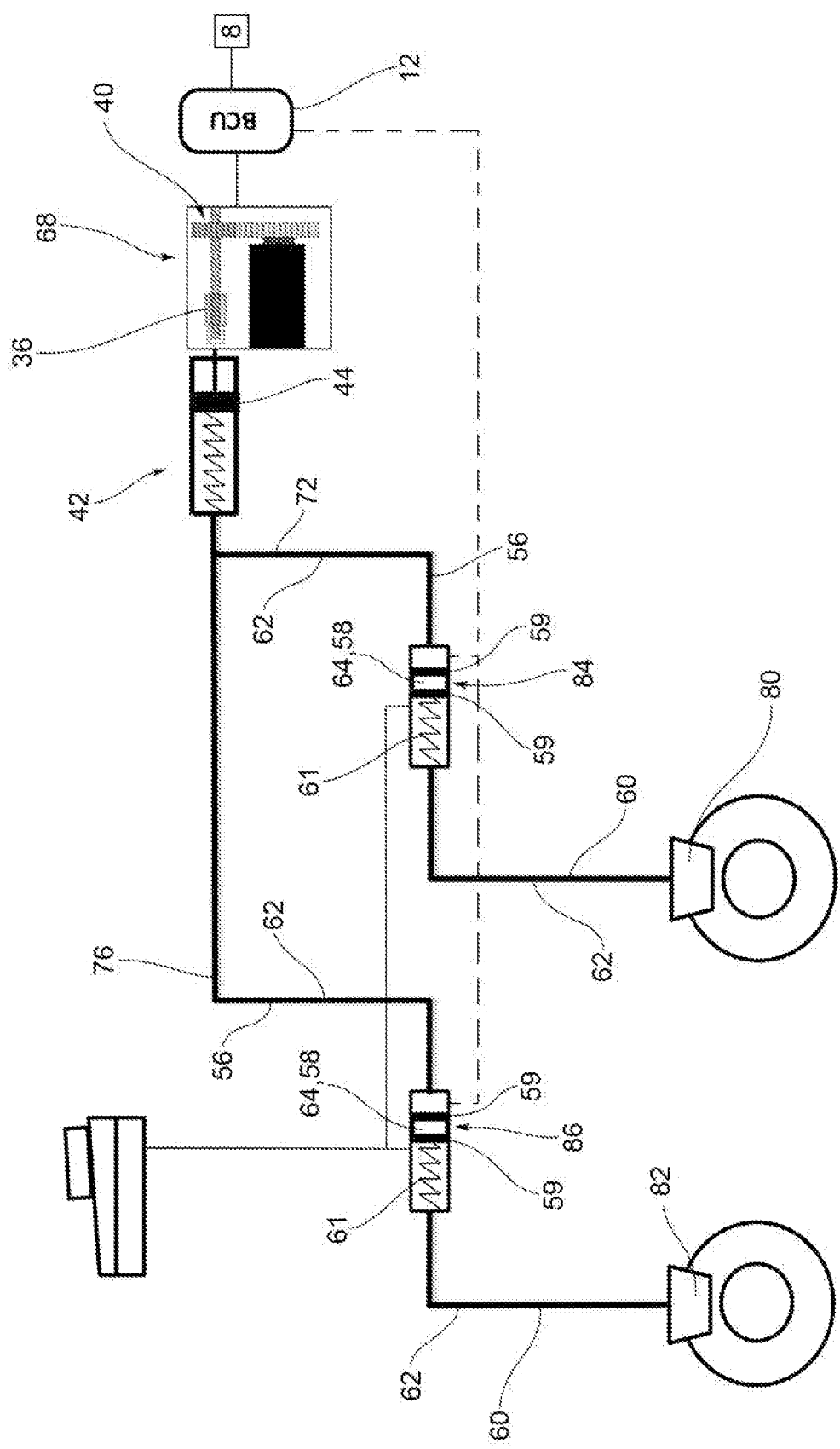

According to a further embodiment, the regulator devices 48,52 comprise secondary pumps suitable to modulate the fluid connection between the first electro-hydraulic actuator device 16 and each corresponding braking device 28',28", said secondary pumps being fluidically connected, via a respective upstream branch 56, with the first electro-hydraulic actuator device 16 and, via a respective downstream branch 60, with the corresponding braking device 28',28", the upstream branches 56 and the downstream branches 60 being crossed by said volume of magneto-rheological or electro-rheological fluid 64 (FIGS. 4,8,12).

The braking system 4 according to the invention may function under different operative conditions.

For example, according to one possible embodiment, the processing and control unit 12 is programmed to actuate the first pressure regulator device 48 to modulate the pressure between the upstream branch 56 and the downstream branch 60 of the first hydraulic supply circuit 20, so as to maintain a constant delivery pressure to said first braking device 28' in the downstream branch 60, while the first electro-mechanical actuator device 16 changes the delivery pressure to the second braking device 28".

This operating condition may be due, for example, to the incipience of a vehicle's instability, for example due to the locking up and subsequent skidding of a vehicle's wheel under the action of the second braking device 28". In this case, it is useful to change the pressure in the delivery branch 60 of the second braking device 28", reducing it enough to recover the rolling condition of said wheel without, however, reducing the pressure also in the delivery branch 60 of the first braking device 28' connected to a corresponding wheel, which is already working in rolling condition. In fact, in such case, there would be an excessive reduction in braking action on the vehicle. Furthermore, the processing and control unit 12 is programmed to restore the delivery pressure of the first electro-hydraulic actuator device 16 so as to equalize the supply pressure value to the first braking device 28' in the downstream branch 60 of the first regulator device 48 and to equalize the pressure of the downstream branches 60 and upstream branches 56 of the first hydraulic supply circuit 20 by actuating the first regulator device 48. In this way, when the condition of instability is terminated, the braking system 4 goes back to operating in a standard manner, i.e., the regulator devices are deactivated so as not to filter or modulate the pressure from the upstream branch 56 of the corresponding hydraulic supply circuit 20,24.

According to a further embodiment, the processing and control unit 12 is programmed so as not to actuate the pressure regulator devices 48,52, as long as the processing and control unit 12 validates the operation of the system 4. 'Validation' means that no abnormal operating condition or any condition that may portend a vehicle's dynamic instability is detected, such as the locking up or slipping on one or more wheels of the vehicle.

In the case correction of the braking is required, the processing and control unit is programmed to change the delivery pressure of the first electro-hydraulic actuator device 16, so as to maintain, preferably, the same actuation pressures of the braking devices 28',28". In the case of the required changing of the actuation pressure of only one of said braking devices 28", the processing and control unit 12 is programmed to actuate the first electro-hydraulic actuator device 16 so as to provide the necessary actuation pressure to said braking device 28" and to modulate the delivery pressure of the other braking device 28', via its own regulator device 48, so as not to be affected by the change of pressure imposed by the first electro-hydraulic actuator device 16.

Therefore, the processing and control unit 12 is programmed to actuate the first regulator device 48 to maintain a constant delivery pressure in the downstream branch 60 of the first braking device 28', while the first electro-hydraulic actuator device 16 changes the delivery pressure to the second braking device 28".

According to one possible embodiment, the processing and control unit 12 is programmed to actuate the first pressure regulator device 48 and the second pressure regulator device 52 simultaneously in order to modulate the delivery pressures in the respective downstream branches 60 of the first and second hydraulic supply circuits 20,24 with respect to the delivery pressure of the first electro-hydraulic actuator device 16, i.e. with respect to the pressure in the respective upstream branches 56 of the first and second hydraulic supply circuits 20,24.

The system according to the present invention may, as seen, comprise a first electro-hydraulic actuator operatively connected to braking devices 28',28" associated with wheels (not shown), which may be arranged on one or more axles of an associable vehicle (motor vehicles, cars and commercial vehicles with different installation layouts).

It is also possible to provide a second electro-hydraulic actuator device 68 (FIG. 13) operatively connected to a third and fourth hydraulic supply circuit 72,76 of a respective third and fourth braking device 80,82, such as a disc brake caliper or drum, wherein the second electro-hydraulic actuator device 68 is actuated by the processing and control unit 12 as a function of the user's braking action request.

The second electro-hydraulic actuator device 68 may be of the same type as the first electro-hydraulic actuator device 16 and may provide respective pressure control devices 84,86 of the same type as those associated with the first electro-hydraulic actuator device 16.

The system of the present invention may operate in such a way that the processing and control unit 12 supervises the control of the dynamics, stability and braking of the vehicle.

For example, the processing and control unit 12 is programmed to actuate the braking devices 28', 28",80,82 by means of the respective first and second electro-hydraulic actuator devices 16,68 and the regulator devices 48,52,84, 86, even when the manual actuation elements are not actuated by the user, so as to stabilize the dynamics of the associable vehicle according to the contingent driving conditions or to respond to automatic drive requests or advanced functionality (automatic emergency braking).

For example, the braking system 4 is provided with speed sensors applied on the wheels connected to the braking devices 28',28",80,82" wherein the processing and control unit 12 is programmed to prevent the locking in rotation of the individual wheels, reducing the braking action on the wheel in the locking phase, by means of the electro-hydraulic actuator devices 16,68 and regulator devices 48,52,84,86.

For example, the processing and control unit 12 is programmed to prevent the skidding in rotation of individual wheels by applying a braking action on the wheel in the skidding phase by means of the electro-hydraulic actuator devices 16,68 and said pressure control devices 48,52,84,86.

Furthermore, the processing and control unit 12 may be programmed to divide the braking action over the individual braking devices 28',28",80,82' so as to stabilize the trajectory of the vehicle, for an equal braking and deceleration action of the vehicle, appropriately actuating the electro-hydraulic actuator devices 16, 68 and the pressure regulator devices 48,52,84,86.

As may be appreciated from the foregoing, the vehicle braking system according to the invention overcomes the disadvantages of the prior art.

In particular, the vehicle braking system according to the present invention enables all the braking and stability control functions of the vehicle to be carried out without requiring the use of an actuator for each wheel of the same vehicle.

In fact, it is possible to use one or more actuators for each vehicle since the single actuator is able to handle and modify, as required, the actuation of two or more separate braking devices to vary the braking torques applied to the corresponding wheels.

In this way, they do not limit the functionality of the anti-lock braking systems (ABS) nor the vehicle stability control (ESP), nor the reliability of the vehicle.

The braking system according to the present invention guarantees conditions of safety. In fact, if malfunctions of the actuators do occur, the system may still operate in the 'standard' hydraulic mode (hydraulic backup not shown).

In fact, the solution of the present invention is characterized in that it envisages the use of a device with magneto-rheological or electro-rheological fluid that is not activated under normal operating conditions of the braking system. Therefore, under normal operating conditions, the braking system operates by pressurizing a hydraulic system, in a known manner.

Under standard conditions, i.e. normal operation, the system guarantees 'BBW'-type operation, i.e., 'brake-by-wire', in order to obtain a reliable, powerful and rapid braking that always satisfies the braking torque requirement that the user implements by actuating the manual actuator or by an automatic request, e.g. via an automatic actuator device, and so that it may autonomously control the dynamics of the vehicle in case of inconsistency between the user-defined path and the actual path traversed by the vehicle.

Moreover, the solution according to the present invention allows for modulated actuation of the braking devices, instead of the prior art solutions which allow on-off-type adjustments.

Furthermore, the use of a magneto-rheological or electro-rheological fluid allows for faster response times than the prior art solutions, on the order of a few milliseconds.

Overall, a reduction in costs, components and dimensions are obtained with respect to the prior art systems.

A person skilled in the art, in the object of satisfying contingent and specific requirements, may make numerous modifications and variations to the braking systems described above, all of which are within the scope of the invention as defined by the following claims.

The invention claimed is:

1. A braking system for vehicles comprising:
    at least one manual and/or automatic actuation device, operatively connected to a processing and control unit to transmit thereto a request for a braking action by a user,
    at least one first electro-hydraulic actuator device operatively connected to a first and to a second hydraulic supply circuit of a respective first and second braking device, the first electro-hydraulic actuator device being actuated by the processing and control unit depending on the request for a braking action,
    wherein inside the first and second hydraulic supply circuits a first and second device for regulating the pressure are inserted, each interposed between the first electro-hydraulic actuator device and the corresponding braking device so as to identify an upstream branch, comprised between the first electro-hydraulic actuator device and the relative pressure regulator device, and a downstream branch, comprised between each pressure regulator device and the relative braking device, each pressure regulator device being operatively connected to the processing and control unit,
    wherein the processing and control unit is programmed to be able to selectively and independently actuate the pressure regulator devices and the first electro-hydraulic actuator device, so as to set or vary the actuation pressures of the braking devices, downstream of the regulator devices, regardless of the delivery pressures of the first electro-hydraulic actuator device, upstream of the regulator devices,
    wherein the first and second hydraulic supply circuits contain at least partially a brake fluid volume and a volume of magneto-rheological or electro-rheological fluid, said brake fluid volume and said volume of magneto-rheological or electro-rheological fluid being fluidically separate from each other,
    wherein the regulator devices comprise electric actuators suitable to generate a magnetic and/or electric field influencing said volume of magneto-rheological or electro-rheological fluid and modifying the rheological properties of the magneto-rheological or electro-rheological fluid to modulate the fluid connection between the first electro-hydraulic actuator device and each corresponding braking device, to selectively vary the delivery pressures in the downstream branches of the respective braking devices.

2. The braking system for vehicles according to claim 1, wherein the processing and control unit is programmed to actuate the first regulator device to modulate the pressure between the upstream branch and the downstream branch of the first hydraulic supply circuit, in order to maintain a constant delivery pressure in said first braking device in the downstream branch, while the first electromechanical actuator device changes the delivery pressure to the second braking device.

3. The braking system for vehicles according to claim 2, wherein the processing and control unit is programmed to:
   restore the delivery pressure of the first electro-hydraulic actuator device so as to equal the value of the delivery pressure to the first braking device in the downstream branch of the first regulator device,
   match the pressure of the downstream and upstream branches of the first hydraulic supply circuit, by actuating the first regulator device.

4. The braking system for vehicles according to claim 1, wherein the brake fluid and magneto-rheological or electro-rheological fluid volumes are fluidically separate from each other, and are at least partially contained inside chambers of the pressure regulator devices, said chamber being demarcated, at least partly, by movable septums which sealingly translate, maintaining the hydraulic separation between the brake fluid and magneto-rheological or electro-rheological fluid.

5. The braking system for vehicles according to claim 4, wherein said movable septums are subject to the action of elastic return means calibrated to bring the septums back to a position at rest, in a condition of disabling or non-use of the braking system.

6. The braking system for vehicles according to claim 1, wherein the pressure regulator devices comprise secondary pumps suitable to modulate the fluid connection between the first electro-hydraulic actuator device and each corresponding braking device, said secondary pumps being fluidically connected via a respective upstream branch, with the first electro-hydraulic actuator device and, via a respective downstream branch, with the corresponding braking device, the upstream and downstream branches being crossed by brake fluid, the secondary pumps being crossed internally by said volume of magneto-rheological or electro-rheological fluid.

7. The braking system for vehicles according to claim 1, wherein the pressure regulator devices comprise secondary pumps suitable to modulate the fluid connection between the first electro-hydraulic actuator device and each corresponding braking device, said secondary pumps being fluidically connected via a respective upstream branch, with the first electro-hydraulic actuator device and, via a respective downstream branch, with the corresponding braking device, the upstream branches being crossed by said volume of magneto-rheological or electro-rheological fluid, the downstream branches being crossed by brake fluid.

8. The braking system for vehicles according to claim 1, wherein the pressure regulator devices comprise secondary pumps suitable to modulate the fluid connection between the first electro-hydraulic actuator device and each corresponding braking device, said secondary pumps being fluidically connected via a respective upstream branch, with the first electro-hydraulic actuator device and, via a respective downstream branch, with the corresponding braking device, the upstream branches being crossed by brake fluid, the downstream branches being crossed by said volume of magneto-rheological or electro-rheological fluid.

9. The braking system for vehicles according to claim 1, wherein the pressure regulator devices comprise secondary pumps suitable to modulate the fluid connection between the first electro-hydraulic actuator device and each corresponding braking device, said secondary pumps being fluidically connected via a respective upstream branch, with the first electro-hydraulic actuator device and, via a respective downstream branch, with the corresponding braking device, the upstream and downstream branches being crossed by said volume of magneto-rheological or electro-rheological fluid.

10. The braking system for vehicles according to claim 1, wherein the first electro-hydraulic actuator device comprises an electric motor which actuates a pusher acting on a pump provided with two pistons arranged in series, each piston being fluidically connected with one of said first and second hydraulic supply circuits.

11. The braking system for vehicles according to claim 1, wherein the first electro-hydraulic actuator device comprises an electric motor which actuates a pusher acting on a pump provided with two pistons arranged in parallel, each piston being fluidically connected with one of said first and second hydraulic supply circuits.

12. The braking system for vehicles according to claim 1, wherein the processing and control unit is programmed to:
   not to actuate the pressure regulator devices, as long as the processing and control unit validates the system operation,
   in case of correction of the braking being required, to change the delivery pressure of the first electro-hydraulic actuator device, so as to maintain said actuation pressures of the braking devices,
   in case of changing of the actuation pressure of only one of said braking devices being required, activating the first electro-hydraulic actuator device so as to provide the necessary actuation pressure to said braking device and modulating the pressure of the delivery branch of the other braking device, by means of its regulator device, so as not to be affected by the change of pressure imposed by the first electro-hydraulic actuator device.

13. The braking system for vehicles according to claim 1, wherein the processing and control unit is programmed to actuate the first regulator device to maintain a constant pressure in the downstream branch of the first braking device, while the first electro-hydraulic actuator device changes the delivery pressure to the second braking device.

14. The braking system for vehicles according to claim 1, wherein the processing and control unit is programmed to actuate the first regulator device and the second pressure regulator device at the same time, to modulate the delivery pressures in the respective downstream branches of the first and second hydraulic supply circuits with respect to the delivery pressure of the first electro-hydraulic actuator device.

15. The braking system for vehicles according to claim 1, wherein the first electro-hydraulic actuator device is operatively connected to the braking devices associated with wheels positioned on a first axle of an associable vehicle.

16. The braking system for vehicles according to claim 1, wherein the processing and control unit supervises the control of the dynamics, stability and braking of the vehicle, and in which it pilots at least one control unit for each electro-hydraulic actuator device.

17. The braking system for vehicles according to claim 1, wherein the processing and control unit is programmed to actuate the braking devices by means of the respective first and second electro-hydraulic actuator devices and the relative regulator devices, even when the manual actuation elements are not actuated by the user, so as to stabilize the dynamics of the associable vehicle according to the driving conditions.

18. The braking system for vehicles according to claim 1, in which the braking system is provided with speed sensors applied on the wheels connected to the braking devices, and in which the processing and control unit is programmed to prevent the locking in rotation of the individual wheels, reducing the braking action on the wheel in locking phase, via the relative electro-hydraulic actuator devices and relative pressure regulator devices.

19. The braking system for vehicles according to claim 1, in which the braking system is provided with speed sensors applied on the wheels influenced by the braking devices, and in which the processing and control unit is programmed to prevent the skidding in rotation of the individual wheels, applying a braking action on the wheel in skidding phase, via the relative electro-hydraulic actuator devices and relative pressure regulator devices.

20. The braking system for vehicles according to claim 1, wherein the processing and control unit is programmed to divide the braking action over the individual braking devices so as to stabilize the trajectory of the vehicle, for an equal braking and deceleration action of the vehicle, appropriately actuating the relative electro-hydraulic actuator devices and the relative pressure regulator devices.

* * * * *